United States Patent
Hatanaka et al.

(10) Patent No.: US 7,646,689 B2
(45) Date of Patent: Jan. 12, 2010

(54) DISK DISCRIMINATING METHOD AND DISK DISCRIMINATING APPARATUS

(75) Inventors: Norio Hatanaka, Kyoto (JP); Ryoichi Ishikawa, Kyoto (JP); Hirofumi Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 780 days.

(21) Appl. No.: 11/337,094

(22) Filed: Jan. 23, 2006

(65) Prior Publication Data

US 2006/0215500 A1  Sep. 28, 2006

(30) Foreign Application Priority Data

Jan. 24, 2005 (JP) ............................ P2005-015520
Jan. 11, 2006 (JP) ............................ P2006-003875

(51) Int. Cl.
  *G11B 7/00* (2006.01)
(52) U.S. Cl. .................................. 369/53.22
(58) Field of Classification Search ............. 369/53.22, 369/53.23, 44.25, 44.26, 44.29
   See application file for complete search history.

(56) References Cited

U.S. PATENT DOCUMENTS

| 6,052,344 | A | | 4/2000 | Ueki | |
|---|---|---|---|---|---|
| 6,141,307 | A | * | 10/2000 | Yoshioka | 369/53.22 |
| 6,147,941 | A | | 11/2000 | Kumagai | |
| 6,295,260 | B1 | * | 9/2001 | Shihara et al. | 369/53.2 |
| 6,760,289 | B1 | * | 7/2004 | Ide | 369/53.2 |
| 6,868,052 | B2 | * | 3/2005 | Konno et al. | 369/53.23 |
| 7,324,418 | B2 | * | 1/2008 | Choi et al. | 369/53.22 |
| 2005/0030867 | A1 | | 2/2005 | Choi et al. | |
| 2005/0047300 | A1 | | 3/2005 | Ono et al. | |

FOREIGN PATENT DOCUMENTS

JP    2000-100059    4/2000

OTHER PUBLICATIONS

Front page of Japanese Office Action issued in Japanese Patent Application No. 2006-003875, mailed Sep. 15, 2009.

* cited by examiner

*Primary Examiner*—Nabil Z Hindi
(74) *Attorney, Agent, or Firm*—McDermott Will & Emery LLP (57) ABSTRACT

To discriminate a disk in a short time, a calculating part 16 measures an amplitude of one of a focus error signal and a tracking error signal, which are output from a differential signal generating part 15, several times, and outputs the measured amplitudes to a controller 20. The controller 20 compares the input amplitudes with threshold values stored in a memory 21, respectively, and determines whether or not an amplification gain of one of the focus error signal and the tracking error signal is changed. If it is determined that the amplification gain of one of the focus error signal and the tracking error signal is changed, the controller 20 changes the amplification gain of one of the focus error signal and the tracking error signal to an amplification gain represented by one of the threshold values and discriminates the kind of an optical disk based on the changed amplification gain.

12 Claims, 9 Drawing Sheets

DISK DISCRIMINATING METHOD AND DISK DISCRIMINATING APPARATUS

BACKGROUND OF THE INVENTION

1. Field of the Invention

The present invention relates to a disk discriminating method and a disk discriminating apparatus, which are capable of discriminating the kind of an optical disk.

2. Description of the Related Art

Figure 9:
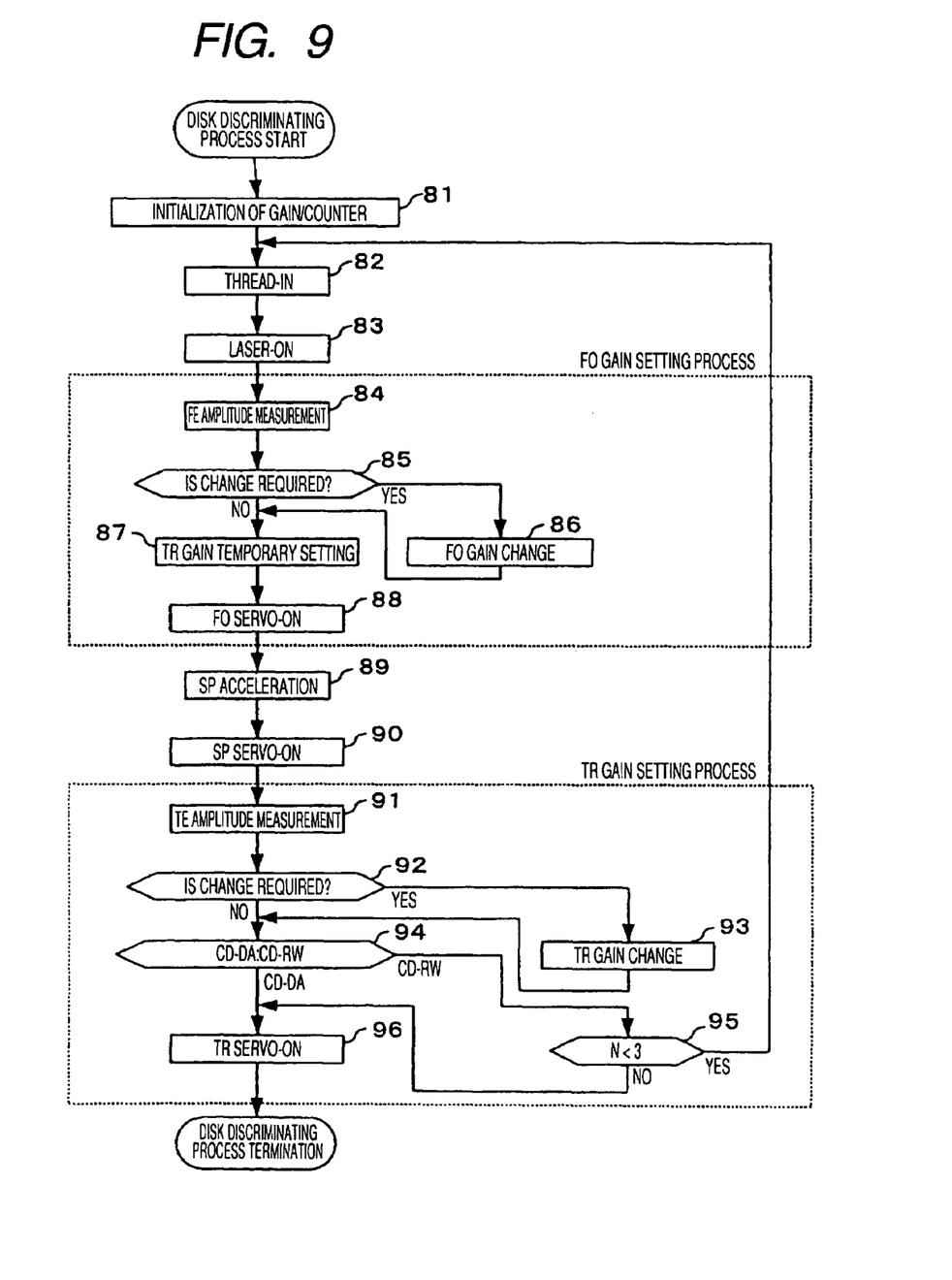
FIG. 9 is a flow chart illustrating an optical disk discriminating process performed by a conventional optical disk reproducing apparatus.

A process of discriminating the kind of an optical disk in a conventional optical disk reproducing apparatus will be described with reference to a flow chart of FIG. 9. First, the conventional optical disk reproducing apparatus initializes a gain set value temporarily stored in a work area, such as a memory, and a CD-RW decision counter (Step 81). Next, the optical disk reproducing apparatus once moves a pickup to the innermost circle of the optical disk using a tracking actuator and detects arrival of the pickup to the innermost circle, and then again moves the pickup to a signal recording part of the disk, which is near the innermost circle (Step 82). Thereafter, the optical disk reproducing apparatus irradiates the optical disk with a laser beam emitted from a laser emitting device provided in the pickup (Step 83). Next, the optical disk reproducing apparatus outputs a focus signal for disturbance, which is used to move the optical disk vertically, to a focus actuator, and generates a focus error signal, which indicates an out-of-focus, from reflected light obtained by light receiving elements of the pickup.

The conventional optical disk reproducing apparatus monitors the generated focus error signal and measures its amplitude from its maximum and minimum values (Step 84), and then compares a threshold value for the focus error signal with the amplitude to determine whether or not a focus gain is required to be changed (Step 85). If it is determined that the focus gain is required to be changed (YES in Step 85), the optical disk reproducing apparatus changes the focus gain (Step 86) and performs Step 87. On the other hand, if it is determined that the focus gain is not required to be changed (NO in Step 85), the optical disk reproducing apparatus set a tracking gain temporarily (Step 87). Thereafter, the optical disk reproducing apparatus switches on a focus servo (Step 88), accelerates rotation of the optical disk (Step 89), and sets a spindle servo to an ON state when acceleration time elapses sufficiently (Step 90).

After setting the spindle servo to the ON state, the conventional optical disk reproducing apparatus outputs a tracking signal for disturbance, which is used to move the optical disk in a radial direction, to a tracking actuator. Thereafter, the optical disk reproducing apparatus generates a tracking error signal from the reflected light obtained by the light receiving elements of the pickup, monitors the generated tracking error signal, and measures its amplitude from its maximum and minimum values (Step 91). Next, the optical disk reproducing apparatus compares a threshold value for the tracking error signal with the measured amplitude to determine whether or not a tracking gain is required to be changed (Step 92). If it is determined that the tracking gain is required to be changed (YES in Step 92), the optical disk reproducing apparatus changes the tracking gain (Step 93) and performs Step 94. On the other hand, if it is determined that the tracking gain is not required to be changed (NO in Step 92), the optical disk reproducing apparatus determines whether the optical disk is a CD-DA or a CD-RW, from set values of the focus gain and the tracking gain (Step 94).

If it is determined that the optical disk is the CD-RW (CD-RW in Step 94), the conventional optical disk reproducing apparatus adds 1 to a counter value N, and then determines whether or not the counter value N is less than a counter threshold value (3) (Step 95). If it is determined that the counter value N is less than the counter threshold value (3) (YES in Step 95), the optical disk reproducing apparatus performs Step 82 to continue the above-described processes. On the other hand, if it is determined that the counter value N is more than the counter threshold value (3) (NO in Step 95), the optical disk reproducing apparatus performs Step 96. If it is determined at Step 94 that the optical disk is the CD-DA (CD-DA in Step 94), the optical disk reproducing apparatus sets a tracking servo to an ON state (Step 96), and then performs a normal reproduction process and terminates the above-described disk discrimination process.

In brief, in the conventional disk discrimination method, when the CD-RW disk is reproduced, the processes of Step 82 to Step 95 are performed by the number of times of counter threshold values in order to increase decision precision by preventing decision miss due to low local reflection locations of the disk.

As described above, in the conventional optical disk reproducing apparatus, since a series of operations is required in order to set the gain of the focus error signal and the gain of the tracking error signal for the optical disk discrimination process performed when information recorded on the optical disk is read, it takes a long time to discriminate the kind of the optical disk. As a result, sound output from a CD player may be started late.

SUMMARY OF THE INVENTION

The present invention has been made in consideration of the above circumstances, and it is an object of the present invention to provide a disk discriminating method and a disk discriminating apparatus, which are capable of discriminating the kind of a disk in a short time.

In order to achieve the above-mentioned object, the present invention provides a disk discriminating method of discriminating the kind of an optical disk, including the steps of measuring an amplitude of one of a focus error signal and a tracking error signal several times, the focus error signal being generated based on a focus drive signal giving disturbance to a pickup in a focus direction and the tracking error signal being generated based on a tracking drive signal giving disturbance to the pickup in a radial direction of the optical disk; comparing the measured amplitude of one of the focus error signal and the tracking error signal with a threshold value; and discriminating the kind of the optical disk according to a result of the comparison.

The conventional disk discriminating technique repeats a series of processes where an amplitude of a focus error signal is measured one time and is compared with a threshold value, an amplitude of a tracking error signal is measured one time and is compared with a threshold value, and the kind of an optical disk is discriminated. However, according to a technical configuration of the present invention, an amplitude of one of the focus error signal and the tracking error signal is measured several times, and, according to a result of comparison between the measured amplitude and a threshold value, the kind of the optical disk can be discriminated based on a plurality of amplitudes, without repeating a series of conventional processes. Accordingly, the kind of a disk can be discriminated in a short time, as compared to the conventional technique.

Preferably, if it is discriminated that the optical disk is of a predetermined kind in the discriminating step, the method proceeds to a subsequent step without returning to the comparing step, and, if it is discriminated that the optical disk is not of the predetermined kind in the discriminating step, the method returns to the comparing step.

Preferably, the measuring step comprises measuring the amplitude at different locations on the optical disk.

Preferably, the measuring step comprises measuring the amplitude at different locations on the optical disk by rotating the optical disk.

Preferably, the measuring step comprises measuring the amplitude at different locations on the optical disk by moving a traverse.

Preferably, the discriminating step comprises determining whether to change an amplification gain of one of the focus error signal and the tracking error signal based on the result of the comparison, changing the amplification gain of one of focus error signal and the tracking error signal based on the threshold value used for the comparison if it is determined to change the amplification gain, and discriminating the kind of the optical disk based on the changed amplification gain.

Preferably, the measuring step comprises measuring the amplitude at the measuring after first measuring using position information of points at which the maximum value and the minimum value of the amplitude of one of the focus error signal and the tracking error signal are measured at the first measuring.

Preferably, the measuring step comprises measuring the focus error signal several times, the comparing step comprises comparing the focus error signal measured several times with a plurality of threshold values, respectively, and the discriminating step comprises changing an amplification gain of the focus error signal to a threshold value used for the comparison according to a result of the comparison whenever the comparison is performed in the comparing step and temporarily setting an amplification gain of the tracking error signal.

Preferably, the disk discriminating method further includes the step of accelerating the rotation of the optical disk. For the accelerated optical disk, an amplitude of the tracking error signal is measured, the measured amplitude of the tracking error signal is compared with the threshold value used for the comparison, and it is determined whether to change the amplification gain of the tracking error signal according to a result of the comparison.

Preferably, the comparing step comprises comparing an average of amplitudes of one of the focus error signal and the tracking error signal with the threshold value, the amplitudes being measured several times.

Preferably, the comparing step comprises comparing the maximum value of amplitudes of one of the focus error signal and the tracking error signal with the threshold value, the amplitudes being measured several times.

Preferably, the comparing step comprises comparing one of amplitudes of one of the focus error signal and the tracking error signal with the threshold value, the amplitudes being measured several times, and selecting the most frequent result of the comparison of all results of the comparison.

In addition, the present invention provides a disk discriminating method including the steps of measuring an amplitude of a tracking error signal several times and storing results of the measurement in respective storing locations in a measurement order; reading a current counter value from the stored results of the measurement, comparing the counter value with a threshold value, and determining whether to change an amplification gain of the tracking error signal; if it is determined in the determining step to change the amplification gain of the tracking error signal, changing the amplification gain of the tracking error signal; and discriminating the kind of a disk, wherein, if it is determined that tracking gain-up is not required, it is discriminated that the disk is a disk with relatively high reflectivity, and then, the method proceeds to a tracking servo-on step, and, if it is determined that the tracking gain-up is required, it is discriminated that the disk is a disk with relatively low reflectivity, and then, the method proceeds to a count routine. If an initial value of the counter is zero and the method proceeds from the discriminating step, 1 is added to the value of the counter, the method proceeds to the determining step after the results of measurement are compared with the threshold value if a result of the addition is less than a prescribed value, and the method proceeds to the tracking servo-on step if the result of the addition is more than the prescribed value.

Further, the present invention provides a disk discriminating method including the steps of measuring an amplitude of a focus error signal several times and storing results of the measurement in respective storing locations in a measurement order; reading a current counter value from the stored results of the measurement, comparing the counter value with a threshold value, and determining whether to change an amplification gain of the focus error signal; if it is determined in the determining step to change the amplification gain of the focus error signal, changing the amplification gain of the focus error signal; and discriminating the kind of a disk, wherein, if it is determined that focus gain-up is not required, it is discriminated that the disk is a disk with relatively high reflectivity, and then, the method proceeds to a focus servo-on step, and, if it is determined that the focus gain-up is required, it is discriminated that the disk is a disk with relatively low reflectivity, and then, the method proceeds to a count routine. If an initial value of the counter is zero and the method proceeds from the discriminating step, 1 is added to the value of the counter, the method proceeds to the determining step after the results of measurement are compared with the threshold value if a result of the addition is less than a prescribed value, and the method proceeds to the focus servo-on step if the result of the addition is more than the prescribed value.

Further, the present invention provides a disk discriminating apparatus for discriminating the kind of an optical disk, including measuring means for measuring an amplitude of one of a focus error signal and a tracking error signal several times, wherein the focus error signal is generated based on a focus drive signal giving disturbance to a pickup in a focus direction and the tracking error signal is generated based on a tracking drive signal giving disturbance to the pickup in a radial direction of the optical disk; comparing means for comparing the measured amplitude of one of the focus error signal and the tracking error signal with a threshold value; and discriminating means for discriminating the kind of the optical disk according to a result of the comparison.

Preferably, if the discriminating means discriminates that the optical disk is of a predetermined kind, the apparatus performs a subsequent process without performing a comparing process by the comparing means, and, if the discriminating means discriminates that the optical disk is not of the predetermined kind, the comparing means performs the comparing process again.

Preferably, the measuring means measures the amplitude at different locations on the optical disk.

Preferably, the measuring means measures the amplitude at different locations on the optical disk by rotating the optical disk.

Preferably, the measuring means measures the amplitude at different locations on the optical disk by moving a traverse.

Preferably, the discriminating means determines whether to change an amplification gain of one of the focus error signal and the tracking error signal based on the result of the comparison, changes the amplification gain of one of focus error signal and the tracking error signal based on the threshold value used for the comparison if it is determined to change the amplification gain, and discriminates the kind of the optical disk based on the changed amplification gain.

Preferably, the measuring means measures the amplitude at the measuring after first measuring using position information of points at which the maximum value and the minimum value of the amplitude of one of the focus error signal and the tracking error signal are measured at the first measuring.

Preferably, the measuring means measures the focus error signal several times, the comparing means compares the focus error signal measured several times with a plurality of threshold values, respectively, and the discriminating means changes an amplification gain of the focus error signal to a threshold value used for the comparison according to a result of the comparison whenever the comparison is performed in the comparing means, and temporarily sets an amplification gain of the tracking error signal.

Preferably, the disk discriminating apparatus further includes rotation accelerating means for accelerating the rotation of the optical disk. For the accelerated optical disk, the measuring means measures an amplitude of the tracking error signal, the comparing means compares the measured amplitude of the tracking error signal with the threshold value used for the comparison, and the discriminating means determines whether to change the amplification gain of the tracking error signal according to a result of the comparison.

Preferably, the comparing means compares an average of amplitudes of one of the focus error signal and the tracking error signal with the threshold value, the amplitudes being measured several times.

Preferably, the comparing means compares the maximum value of amplitudes of one of the focus error signal and the tracking error signal with the threshold value, the amplitudes being measured several times.

Preferably, the comparing means compares one of amplitudes of one of the focus error signal and the tracking error signal with the threshold value, the amplitudes being measured several times, and selects the most frequent result of the comparison of all results of the comparison.

The conventional disk discriminating technique repeats a series of processes where an amplitude of a focus error signal is measured one time and is compared with a threshold value, an amplitude of a tracking error signal is measured one time and is compared with a threshold value, and the kind of an optical disk is discriminated. However, according to a technical configuration of the present invention, an amplitude of one of the focus error signal and the tracking error signal is measured several times, and, according to a result of comparison between the measured amplitude and a threshold value, the kind of the optical disk can be discriminated based on a plurality of amplitudes, without repeating a series of conventional processes. Accordingly, the kind of a disk can be discriminated in a short time, as compared to the conventional technique.

DESCRIPTION OF THE PREFERRED EMBODIMENTS

Hereinafter, exemplary embodiments of the present invention will be described in conjunction with the drawings.

First Embodiment

Figure 1:
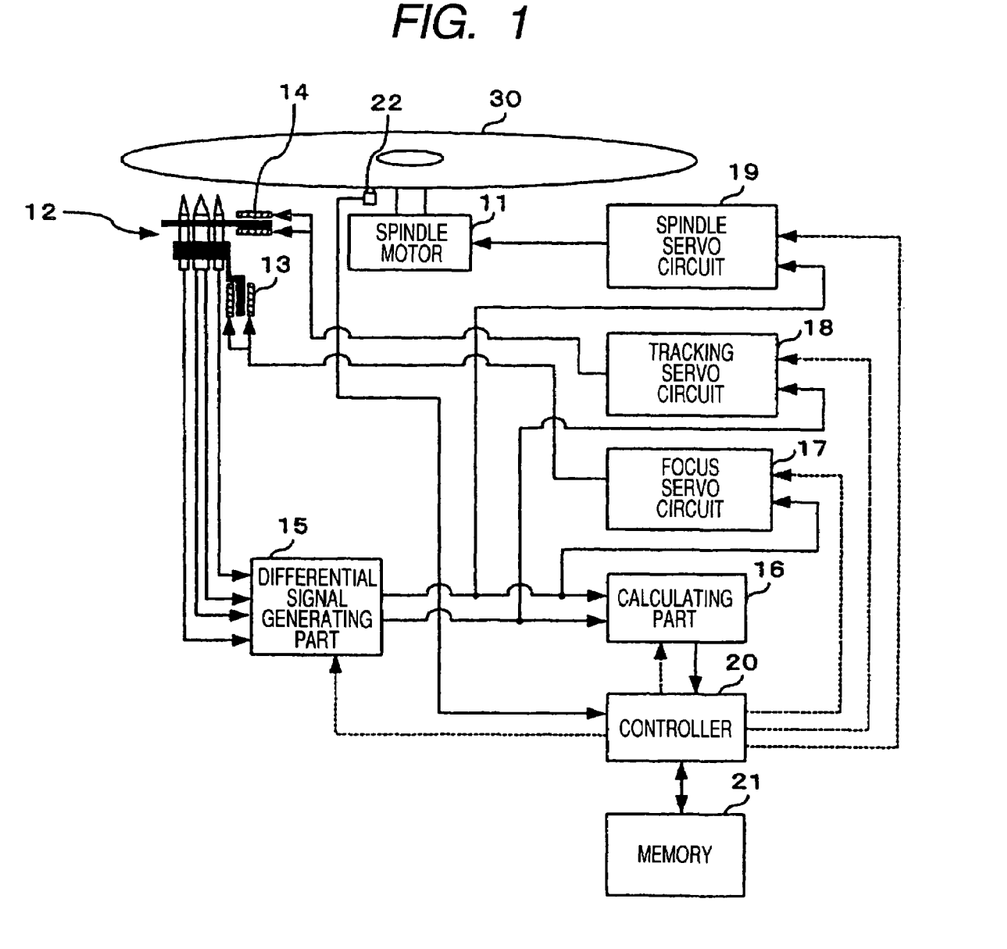
FIG. 1 is a block diagram illustrating configuration of an optical disk reproducing apparatus according to a first embodiment of the present invention.

FIG. 1 is a block diagram illustrating configuration of an optical disk reproducing apparatus according to a first embodiment of the present invention. As shown in FIG. 1, a disk discriminating apparatus in this embodiment includes a spindle motor 11 for rotating a spindle on which an optical disk 30 is mounted, a pickup 12, a focus actuator 13, a tracking actuator 14, a differential signal generating part 15, a calculating part 16, a focus servo circuit 17, a tracking servo circuit 18, a spindle servo circuit 19, a controller 20, a memory 21, and a pickup detecting part 22.

The pickup 12 irradiates a main-beam and two sub-beams on the optical disk 30 for signal read, and detects reflected light from the optical disk 30, separately, thereby outputting three read signals M-RF, E-RF and F-RF. The focus actuator 13 moves the pickup 12 vertically in a focus direction according to a focus drive signal. The tracking actuator 14 moves the pickup 12 in a radial direction of the optical disk 30 according to a tracking drive signal.

The differential signal generating part 15 generates and output a tracking error signal based on the read signals E-RF and F-RF of the two sub-beams output from the pickup 12, while generating and outputting a focus error signal based on the main read signal M-RF read by the main-beam.

The calculating part 16 monitors the focus error signal and the tracking error signal, calculates a focus error amplitude value and a tracking error amplitude value by adding absolute values of maximum values of the respective error signals and absolute values of minimum values of the respective error signals, respectively, and outputs the calculated focus error amplitude value and tracking error amplitude value to the controller 20.

The focus servo circuit 17 outputs the focus drive signal, which adjusts the focus of the main-beam irradiated from the pickup 12, to the focus actuator 13, based on the focus error signal input to the focus servo circuit 17. The tracking servo circuit 18 outputs the tracking drive signal, which adjusts the movement of the pickup 12 such that the main-beam is correctly irradiated on track pitches of the optical disk 30, to the tracking actuator 14, based on the tracking error signal input to the tracking servo circuit 18. The spindle servo circuit 19 outputs a spindle drive signal, which controls the number of revolutions of the spindle motor 11, to the spindle actuator 11, based on the focus error signal input to the spindle servo circuit 19.

The controller 20 controls the differential signal generating part 15, the calculating part 16, the focus servo circuit 17, the tracking servo circuit 18, and the spindle servo circuit 19. In addition, the controller 20 determines and sets a focus gain based on the focus error amplitude value input from the calculating part 16, while deciding and setting a tracking gain based on the tracking error amplitude value input from the calculating part 16. In addition, the controller 20 discriminate the kind of the optical disk 30 based on the tracking gain.

The memory 21 includes a ROM for storing a control program to describe operations performed by the controller 20 and a RAM for temporarily storing data required for various processes. The pickup detecting part 22 detects that the pickup 12 arrives at the innermost circle of the optical disk 30, and outputs a detection signal to the controller 20.

Figure 2A:
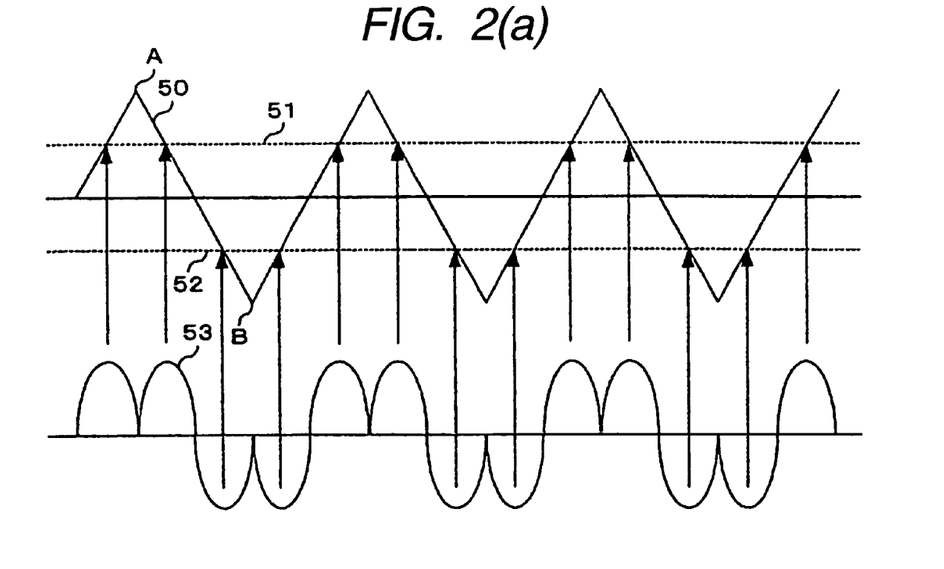
FIGS. 2A and 2B are waveform diagrams of drive signals and error signals for the drive signals.
Figure 2B:
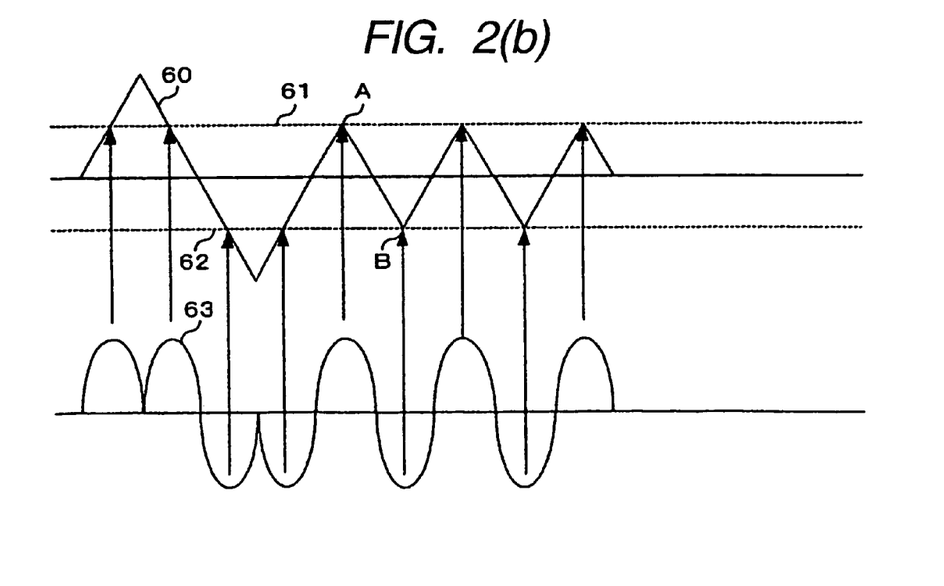

In the following description, a correspondence relationship between the focus drive signal generated by the focus servo circuit 17 and the focus error signal for the focus drive signal and between the tracking drive signal generated by the tracking servo circuit 18 and the tracking error signal for the tracking drive signal will be described. FIGS. 2A and 2B are waveform diagrams of drive signals and error signals for the drive signals. If a drive signal 50 is the tracking drive signal giving disturbance to the pickup in a focus direction, the tracking drive signal is constant in the time at which it is output to the tracking actuator 14 and its gain (amplification gain), and its voltage is regularly reversed. In other words, the tracking drive signal is produced while the main-beam alternates between an inner circle and an outer circle of the optical disk. The tracking error signal takes a value depending on a distance between a central position of the main-beam and a center of a track. If the drive signal 50 is the focus drive signal giving disturbance to the pickup in a radial direction of the optical disk, the focus drive signal is constant in the time at which it is output to the focus actuator 13 and its gain (amplification gain), like the tracking drive signal, and its voltage is regularly reversed. In other words, the focus drive signal is produced while the main-beam vertically alternates in the focus direction. The focus error signal takes a value depending on an out-of-focus of the laser beam.

In addition, as shown in FIG. 2A, a voltage of an error signal 53 indicating the focus error signal and the tracking error signal generated by the differential signal generating part 15 increases as the drive signal 50 increases from a zero voltage to voltages denoted by dotted lines 51 and 52, with its maximum and minimum values at the voltages denoted by the dotted lines 51 and 52, respectively. Thereafter, as the voltage of the drive signal 50 becomes the maximum and minimum voltages denoted by A and B in the figure, respectively, the voltage of the error signal 53 decreases to a zero voltage at the maximum and minimum voltages of the drive signal 50. Thereafter, the error signal 53 increases as the drive signal 50 decrease from the maximum voltage and the minimum voltage to the voltages denoted by the dotted lines 51 and 52, respectively, with its maximum and minimum values at the voltages denoted by the dotted lines 51 and 52, respectively. Thereafter, as the drive signal 50 decreases to a zero voltage, the error signal 53 decrease to a zero voltage at the zero voltage of the drive signal 50. Here, voltages of the error signal output when the drive signal 50 is the voltages denoted by the dotted lines 51 and 52 are referred to as the maximum voltage and the minimum voltage of the error signal, respectively. The calculating part 16 calculates values, which are obtained by adding the absolute values of the maximum values and the absolute values of the minimum values of the focus error signal and the tracking error signal output from the differential signal generating part 15, as a focus error amplitude and a tracking error amplitude, respectively.

In addition, as shown in FIG. 2B, an error signal 63 outputs the same output waveform as the voltage shown in FIG. 2A for one cycle of a drive signal 60. However, for later cycles, since the maximum voltage of the drive signal 60 denoted by A and the minimum voltage of the drive signal 60 denoted by B are voltages corresponding to dotted lines 61 and 62, respectively, denoting the maximum voltage and the minimum voltage, which may be assumed by the error signal 63, the voltage of the error signal 63 does not become 0 even when the voltage of the drive signal 63 becomes the maximum voltage and the minimum voltage, and the maximum voltage and the minimum voltage of the error signal 63 are alternately output at the maximum voltage and the minimum voltage of the drive signal 60, respectively.

In addition, a period of time during which the voltage of the drive signal 50 or 60 is far from a center of sum focus or on-track point indicated by a voltage larger than the voltages indicated by the dotted lines 51 and 52 or the dotted lines 61 and 62 is a period of time not required for measurement. Accordingly, the focus servo circuit 17 and the tracking servo circuit 18 first store the maximum voltage and the minimum voltage in order to omit this period of time, and take the maximum voltage and the minimum voltage as the voltages denoted by the dotted lines 61 and 62, respectively, when the drive signal 60 after a second cycle is output, as shown in FIG. 2B. With this configuration, the period of time not required for measurement may be omitted, thus reducing time required for disk discrimination.

Next, an optical disk discrimination process performed by the optical disk reproducing apparatus according to the first embodiment will be described.

Figure 3:
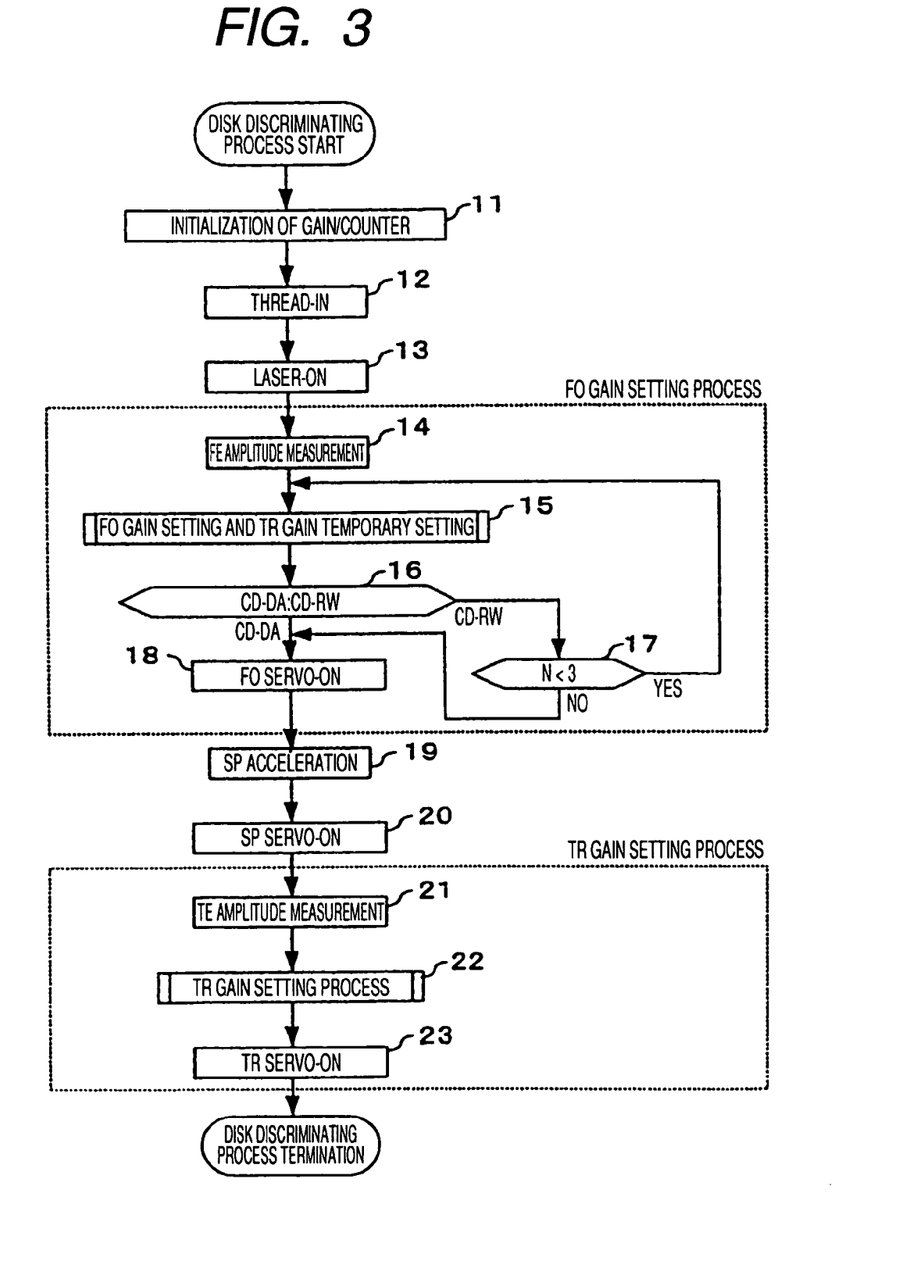
FIG. 3 is a flow chart illustrating an optical disk discriminating process performed by the optical disk reproducing apparatus according to the first embodiment.

FIG. 3 is a flow chart illustrating an optical disk discriminating process performed by the optical disk reproducing apparatus according to the first embodiment. First, the controller 20 initializes the focus gain value and the tracking gain value stored in the memory 21, while initializing a count N when a previous optical disk 30 is discriminated, the count N being stored in a counter provided in the memory 21, to be zero (Step 11). Next, the tracking actuator 14 once moves the pickup 12 to the innermost circle of the optical disk, and the pickup detecting part 22 detects arrival of the pickup 12 to the innermost circle and outputs a detection signal to the controller 20. Thereafter, the controller 20 moves the pickup 12 to a signal recording part of the optical disk 30, which is near the innermost circle (Step 12). The pickup 12 irradiates laser beams to the disk 30 with (Step 13). The drive signal generating part 17 gives disturbance to the focus actuator 13 and vertically moves the focus actuator 13 in the focus direction. In addition, the calculating part 16 monitors the focus error signal output from the differential signal generating part 15, measures a result value of addition of the absolute value of its maximum value and the absolute value of its minimum value as the focus error amplitude several times, and stores the plurality of measured focus error signals in the memory 21. Thereafter, the calculating 16 reads the plurality of focus error amplitudes stored in the memory 21 and calculates an average of the plurality of focus error amplitudes, with the average taken as a new focus error amplitude (Step 14).

Next, the controller 20 performs a process of temporarily setting a focus gain and a tracking gain from a threshold value for the focus error signal, the threshold value representing a reference value for change of the focus gain, and an input focus error amplitude (Step 15; this step will be described in detail later). The controller 20 determines whether the optical disk is a disk with relatively high reflectivity or a disk with relatively low reflectivity from the set focus gain (Step 16). If it is determined that the optical disk is a disk with relatively high reflectivity (disk with relatively high reflectivity in Step 16), the controller 20 performs Step 18. On the contrary, if it is determined that the optical disk is a disk with relatively low reflectivity (disk with relatively low reflectivity in Step 16), the controller 20 increments the counter value N by one and determines whether or not the incremented counter value N is less than a counter threshold value (Step 17). If it is determined that the counter value N is less than the counter threshold value (YES in Step 17), the controller 20 performs Step 15 to continue the above-described processes. On the contrary, if it is determined that the counter value N exceeds the counter threshold value (NO in Step 17), the controller 20 determines that the optical disk 30 is the disk with relatively low reflectivity and then performs Step 18. In Step 18, the controller 20 outputs the focus drive signal from the focus servo circuit 17 (Step 18), accelerates the rotation of the spindle motor 11 (Step 19) and outputs a control signal for controlling the rotation of the spindle motor 11 from the spindle servo circuit 19 after acceleration time elapses sufficiently (Step 20).

Here, the disk with relatively high reflectivity may include a press disk such as CD-DA, a recordable disk such as CD-R, etc. in case of CD. On the contrary, the disk with relatively low reflectivity may include a rewritable disk such as CD-RW in case of CD. Although the discrimination on CD-DA and CD-RW is illustrated in this embodiment, the present invention may discriminate CD-R and CD-RW in the same way as the above described way without limitation in the discrimination on CD-DA and CD-RW. In addition, the present invention may discriminate disks such as DVD (digital versatile disk), BD (blue-ray disk) and so on, in addition to CD, in the same way. In addition, the reflectivity of the press disk is three or four times the reflectivity of the rewritable disk.

The tracking servo circuit 18 gives disturbance to the tracking actuator 14 and moves the optical disk 30 in the radial direction. In addition, the calculating part 16 monitors the tracking error signal input from the differential signal generating part 15, the tracking error signal being produced from reflected light of a sub-beam, measures a result value of addition of the absolute value of its maximum value and the absolute value of its minimum value as the tracking error amplitude several times, and stores the plurality of measured tracking error signals in the memory 21. Thereafter, the calculating 16 reads the plurality of tracking error amplitudes stored in the memory 21, calculates an average of the plurality of tracking error amplitudes, with the average taken as a new tracking error amplitude, and outputs the new tracking error amplitude to the controller 20 (Step 21).

The controller 20 performs a tracking change process from a threshold value for the tracking error signal, the threshold value representing a reference value for change of the tracking gain, and an input tracking error amplitude (Step 22), which will be described in detail later. Thereafter, the controller 20 outputs a tracking drive signal from the tracking server circuit 18 (Step 24) and terminates the discrimination process on the optical disk 30.

In addition, the processes of Step 14 to Step 18 show the focus (FO) gain setting process and the processes of Step 21 to Step 23 show the tracking (TR) gain setting process.

Figure 4:
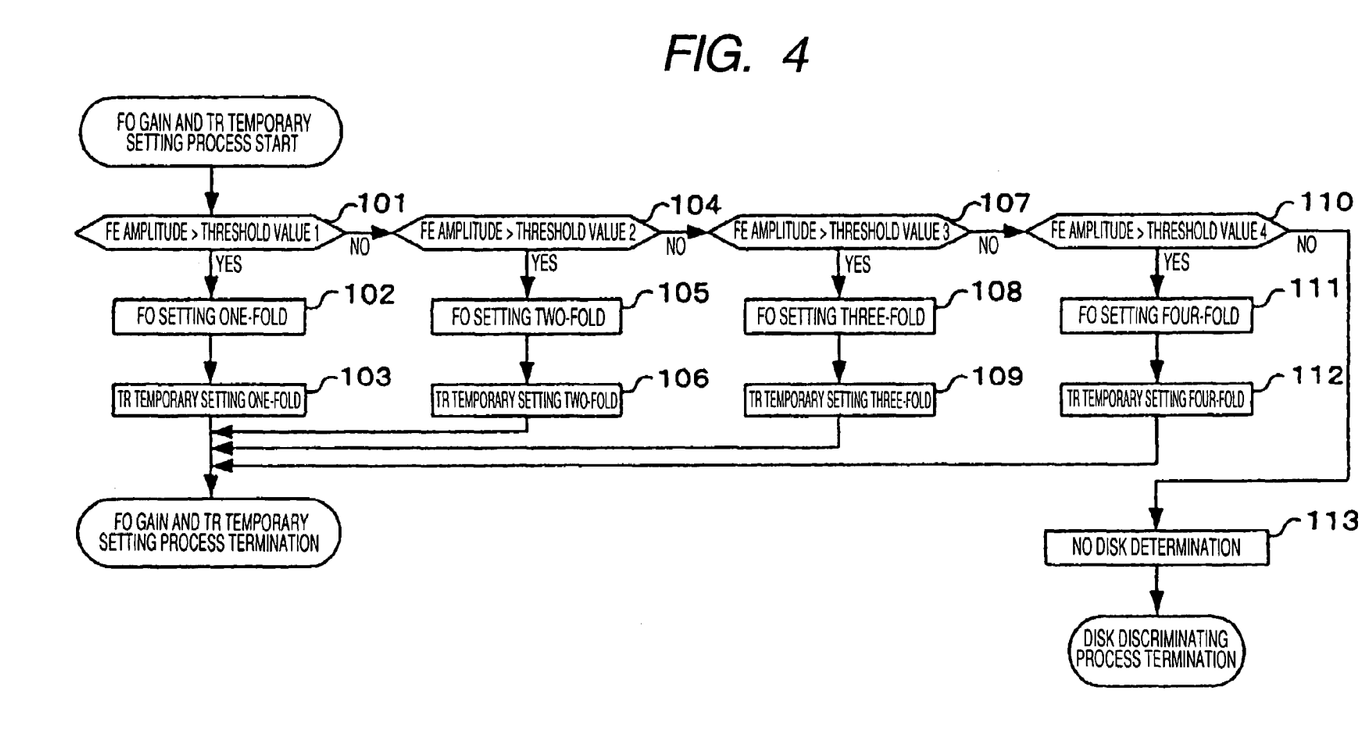
FIG. 4 is a flow chart illustrating a process of Step 15 in FIG. 3.

FIG. 4 is a flow chart illustrating a process of setting the focus gain and temporarily setting the tracking gain in Step 15 of FIG. 3. The controller 20 determines whether or not the focus error amplitude is larger than a pre-stored one-fold threshold value (Step 101). If it is determined that the focus error amplitude is larger than the one-fold threshold value (YES in Step 101), the controller 20 performs Step 102. If it is determined that the focus error amplitude is smaller than the one-fold threshold value (NO in Step 101), the controller 20 determines whether or not the focus error amplitude is larger than a pre-stored two-fold threshold value (Step 104). If it is determined that the focus error amplitude is larger than the two-fold threshold value (YES in Step 104), the controller 20 performs Step 105. If it is determined that the focus error amplitude is smaller than the two-fold threshold value (NO in Step 104), the controller 20 determines whether or not the focus error amplitude is larger than a pre-stored three-fold threshold value (Step 107). If it is determined that the focus error amplitude is larger than the three-fold threshold value (YES in Step 107), the controller 20 performs Step 108. If it is determined that the focus error amplitude is smaller than the three-fold threshold value (NO in Step 107), the controller 20 determines whether or not the focus error amplitude is larger than a pre-stored four-fold threshold value (Step 110). If it is determined that the focus error amplitude is larger than the four-fold threshold value (YES in Step 110), the controller 20 performs Step 112. If it is determined that the focus error amplitude is smaller than the four-fold threshold value (NO in Step 110), the controller 20 determines that there is no optical disk (Step 113) and terminates the disk discrimination process.

In Step 101, if the focus error amplitude is larger than the one-fold threshold value (YES in Step 101), the controller 20 sets the focus gain to one-fold (Step 102), temporarily sets the tracking gain to one-fold (Step 103), and terminates the focus gain setting process. In Step 104, if the focus error amplitude is larger than the two-fold threshold value (YES in Step 104), the controller 20 sets the focus gain to two-fold (Step 105), temporarily sets the tracking gain to two-fold (Step 106), and terminates the focus gain setting process. In Step 107, if the focus error amplitude is larger than the three-fold threshold value (YES in Step 107), the controller 20 sets the focus gain to three-fold (Step 108) and temporarily sets the tracking gain to three-fold (Step 109). In Step 110, if the focus error amplitude is larger than the four-fold threshold value (YES in Step 110), the controller 20 sets the focus gain to four-fold (Step 111), temporarily sets the tracking gain to four-fold (Step 112), and terminates the focus gain setting process.

Figure 5:
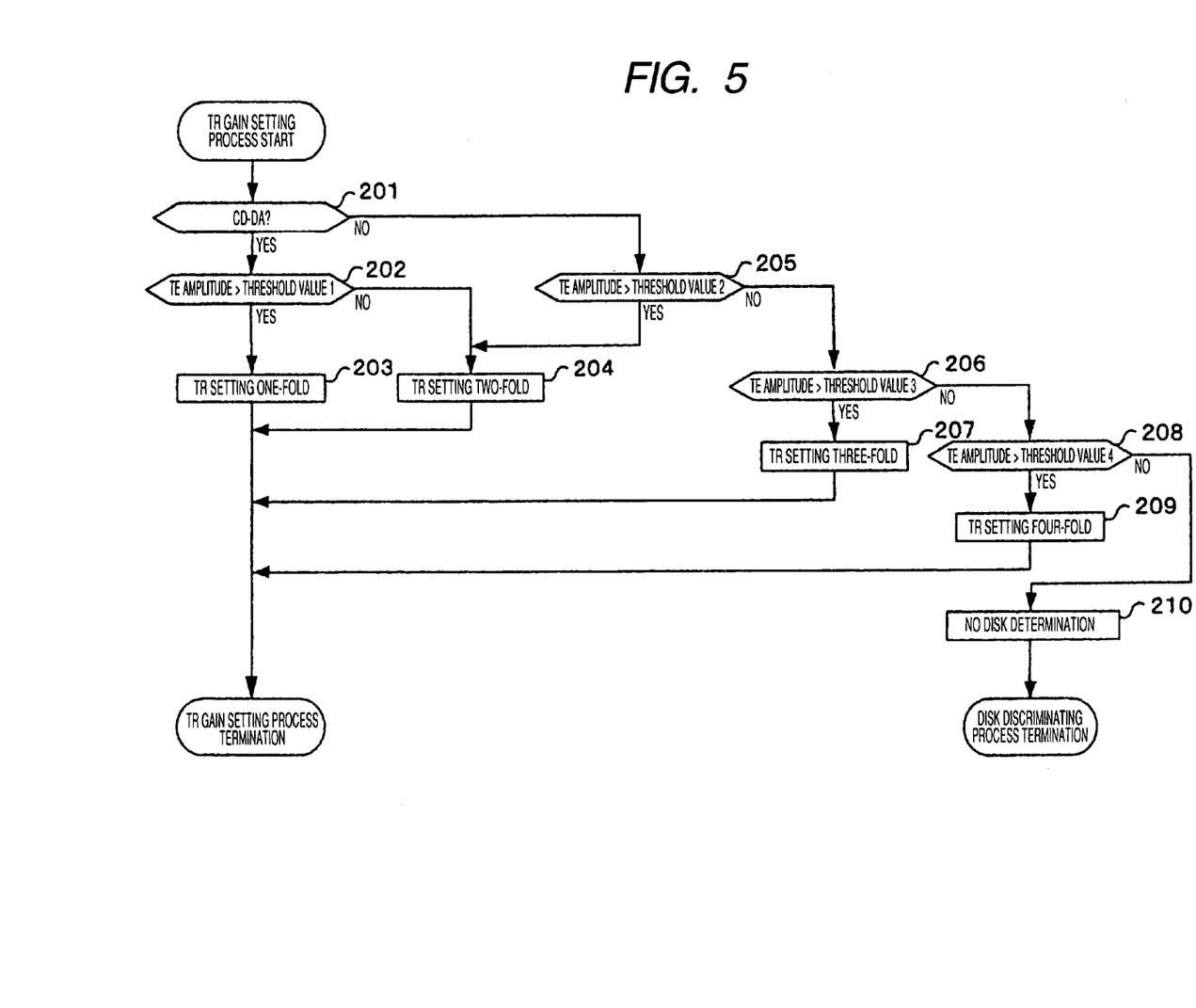
FIG. 5 is a flow chart illustrating a process of Step 22 in FIG. 3.

FIG. 5 is a flow chart illustrating the tracking gain setting process in FIG. 3. When the tracking error amplitude is calculated by the calculating part 16, the controller 20 determines whether or not the optical disk 30 is CD-DA, according to a result of the CD-DA discrimination in Step 16 in the above-described focus gain setting process (Step 201). If it is determined that the optical disk 30 is not CD-DA (NO in Step 201), the controller 20 performs Step 205. If it is determined that the optical disk 30 is CD-DA (YES in Step 201), the controller 20 determines whether or not the tracking error amplitude is larger than the pre-stored one-fold threshold value (Step 202).

If it is determined that the tracking error amplitude is larger than the one-fold threshold value (YES in Step 202), the controller 20 sets the tracking gain to one-fold (Step 203) and terminates the tracking gain setting process. If it is determined that the tracking error amplitude is smaller than the one-fold threshold value (NO in Step 202), the controller 20 temporarily sets the tracking gain to two-fold (Step 204) and terminates the tracking gain setting process. In Step 201, if it is determined that the optical disk 30 is not CD-DA (NO in Step 201), the controller 20 determines whether or not the tracking error amplitude is larger than the pre-stored two-fold threshold value (Step 205). If it is determined that the tracking error amplitude is larger than the pre-stored two-fold threshold value (YES in Step 205), the controller 20 performs Step 204. If it is determined that the tracking error amplitude is smaller than the pre-stored two-fold threshold value (NO in Step 205), the controller 20 determines whether or not the tracking error amplitude is larger than the three-fold threshold value (Step 206).

If it is determined that the tracking error amplitude is not larger than the three-fold threshold value (NO in Step 206), the controller 20 performs Step 208. If it is determined that the tracking error amplitude is larger than the three-fold threshold value (YES in Step 206), the controller 20 sets the tracking gain to three-fold (Step 207) and terminates the tracking gain setting process. If it is determined that the tracking error amplitude is not larger than the three-fold threshold value (NO in Step 206), the controller 20 determines whether or not the tracking error amplitude is larger than the pre-stored four-fold threshold value (Step 208). If it is determined that the tracking error amplitude is larger than the four-fold threshold value (YES in Step 208), the controller 20 sets the tracking gain to four-fold (Step 209) and terminates the tracking gain setting process. If it is determined that the tracking error amplitude is smaller than the four-fold threshold value (NO in Step 208), the controller 20 determines that there is no optical disk 30 and terminates the disk discrimination process.

According to the optical disk reproducing apparatus in this embodiment, by discriminating the kind of the optical disk 30 after measuring the focus error amplitude and changing the focus gain, if necessary, in the focus (FO) gain setting process and temporarily setting the tracking gain and by performing the focus gain setting process and the tracking (TR) gain setting process in the conventional optical disk reproducing apparatus several times, the kind of the optical disk 30 can be even quickly discriminated as compared to when the kind of the optical disk 30 is discriminated for the first time.

According to the optical disk reproducing apparatus in this embodiment, by taking an average of a plurality of focus error amplitudes, which is calculated by the calculating part 16, as a new focus error amplitude and taking an average of a plurality of tracking error amplitudes, which is calculated by the calculating part 16, as a new tracking error amplitude and by setting a focus gain and temporarily setting a tracking gain based on the new focus and tracking error amplitudes, it is possible to improve precision of discrimination of optical disks 30 with differences in reflectivity, which may occur when there are variations in laser power in writing data into the optical disks 30 or when data are written into the same disk by a plurality of drives with different laser power.

Figure 6A:
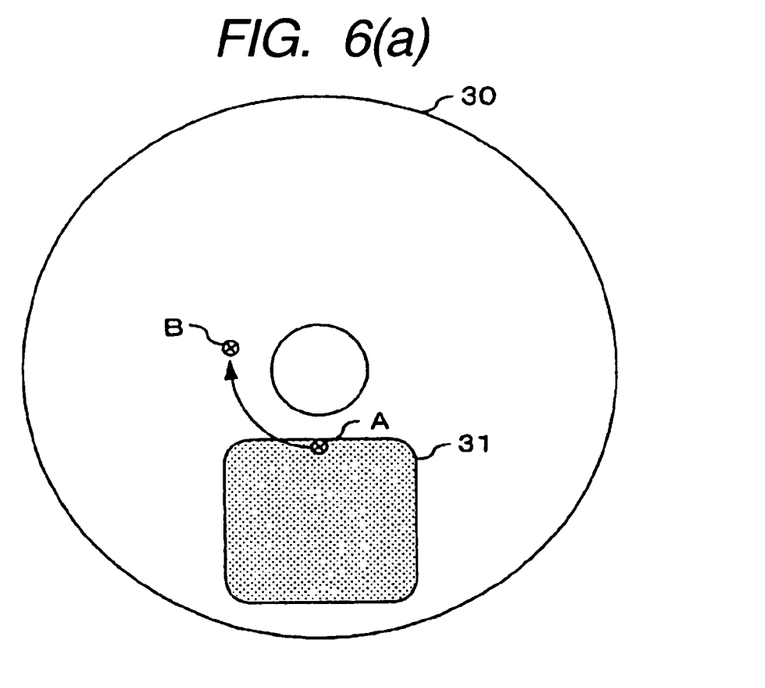
FIG. 6 are views explaining that the kind of the optical disk can be discriminated even when there is any contamination on the optical disk.
Figure 6B:
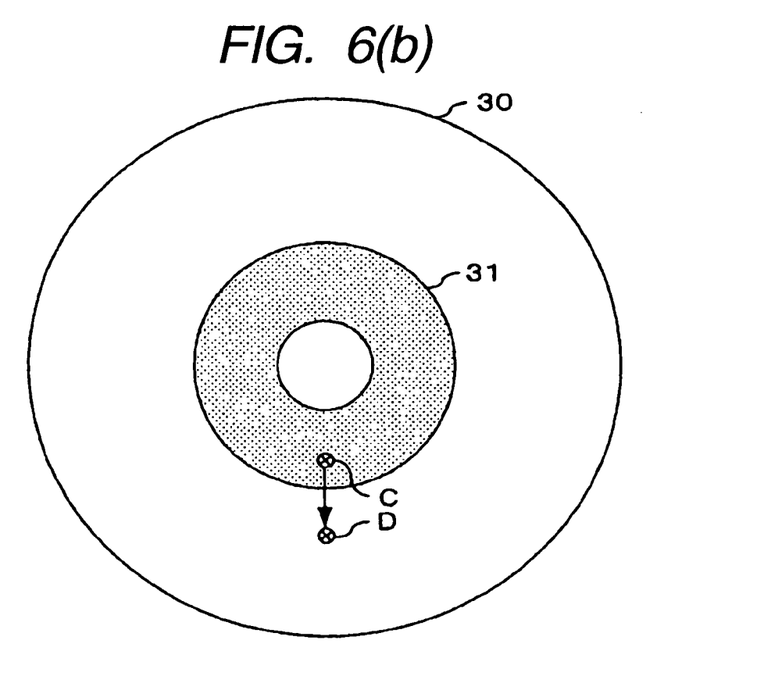

In addition, according to the optical disk reproducing apparatus in this embodiment, in an optical disk 30 having one lump of contaminant 31 as shown by a net in FIGS. 6A and 6B, even if there exists a pickup at locations denoted by A and C in the contaminant 31 and, accordingly, it seems that it is not possible to set a gain properly or discriminate the kind of a disk as the focus error amplitude and the tracking error amplitude become small, the kind of the optical disk 30 can be discriminated since an amplitude of a normal error signal can be measured by moving the pickup 12 to locations denoted by B and D without contaminant.

Second Embodiment

Figure 7:
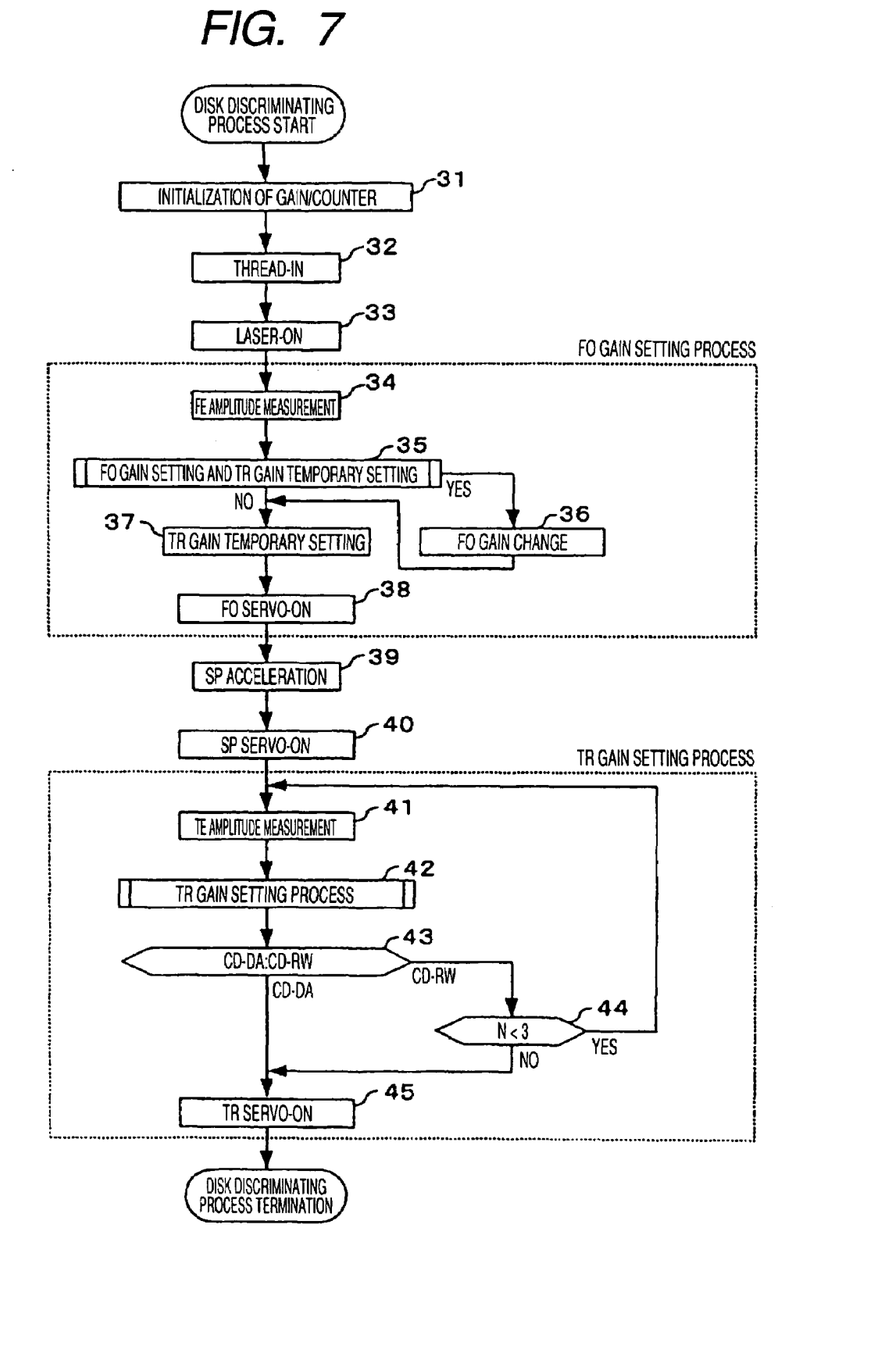
FIG. 7 is a flow chart illustrating an optical disk discriminating process performed by an optical disk reproducing apparatus according to a second embodiment of the present invention.

FIG. 7 is a flow chart illustrating a process performed by an optical disk reproducing apparatus according to a second embodiment of the present invention. Since a disk discriminating apparatus according to the second embodiment has the same components as the optical disk reproducing apparatus according to the first embodiment, reference numerals for components required for explanation of the disk discriminating process are the same as those in the optical disk reproducing apparatus according to the first embodiment. However, the optical disk reproducing apparatus of the second embodiment is different from the optical disk reproducing apparatus of the first embodiment in that Step 16 of determining whether the optical disk is CD-DA or CD-RW and Step 17 of determining whether or not the counter value N is less than 3 in the focus gain setting process in the process of the optical disk reproducing apparatus of the first embodiment shown in FIG. 3 are changed to Step 43 and Step 44 in the tracking (TR) gain setting process in the process of the optical disk reproducing apparatus of the second embodiment shown in FIG. 7. Accordingly, except this difference, the process of the optical disk reproducing apparatus of the second embodiment is the same as the process described in the first embodiment, and therefore, detailed explanation thereof will be omitted.

According to the optical disk reproducing apparatus in the second embodiment, by discriminating the kind of the optical disk 30 after measuring the tracking error amplitude and setting the focus gain, if necessary, in the tracking (TR) gain setting process and temporarily setting the tracking gain and by performing the focus gain setting process and the tracking (TR) gain setting process in the conventional optical disk reproducing apparatus several times, the kind of the optical disk 30 can be even quickly discriminated as compared to when the kind of the optical disk 30 is discriminated for the first time.

According to the optical disk reproducing apparatus in the second embodiment, by taking an average of a plurality of focus error amplitudes, which is calculated by the calculating part 16, as a new focus error amplitude and taking an average of a plurality of tracking error amplitudes, which is calculated by the calculating part 16, as a new tracking error amplitude and by setting a focus gain and temporarily setting a tracking gain based on the new focus and tracking error amplitudes, it is possible to improve precision of discrimination of the optical disks 30 with differences in reflectivity, which may occur when there are variations in laser power in writing data into the optical disks 30 or when data are written into the same disk by a plurality of drives with different laser power.

In addition, according to the optical disk reproducing apparatus in the second embodiment, in an optical disk 30 having one lump of contaminant 31 as shown by a net in FIGS. 6A and 6B, even if there exists a pickup at locations denoted by A and C in the contaminant 31 and, accordingly, it seems that it is not possible to set a gain properly or discriminate the kind of a disk as the focus error amplitude and the tracking error amplitude become small, the kind of the optical disk 30 can be discriminated since an amplitude of a normal error signal can be measured by moving the pickup 12 to locations denoted by B and D with no contaminant.

Figure 8:
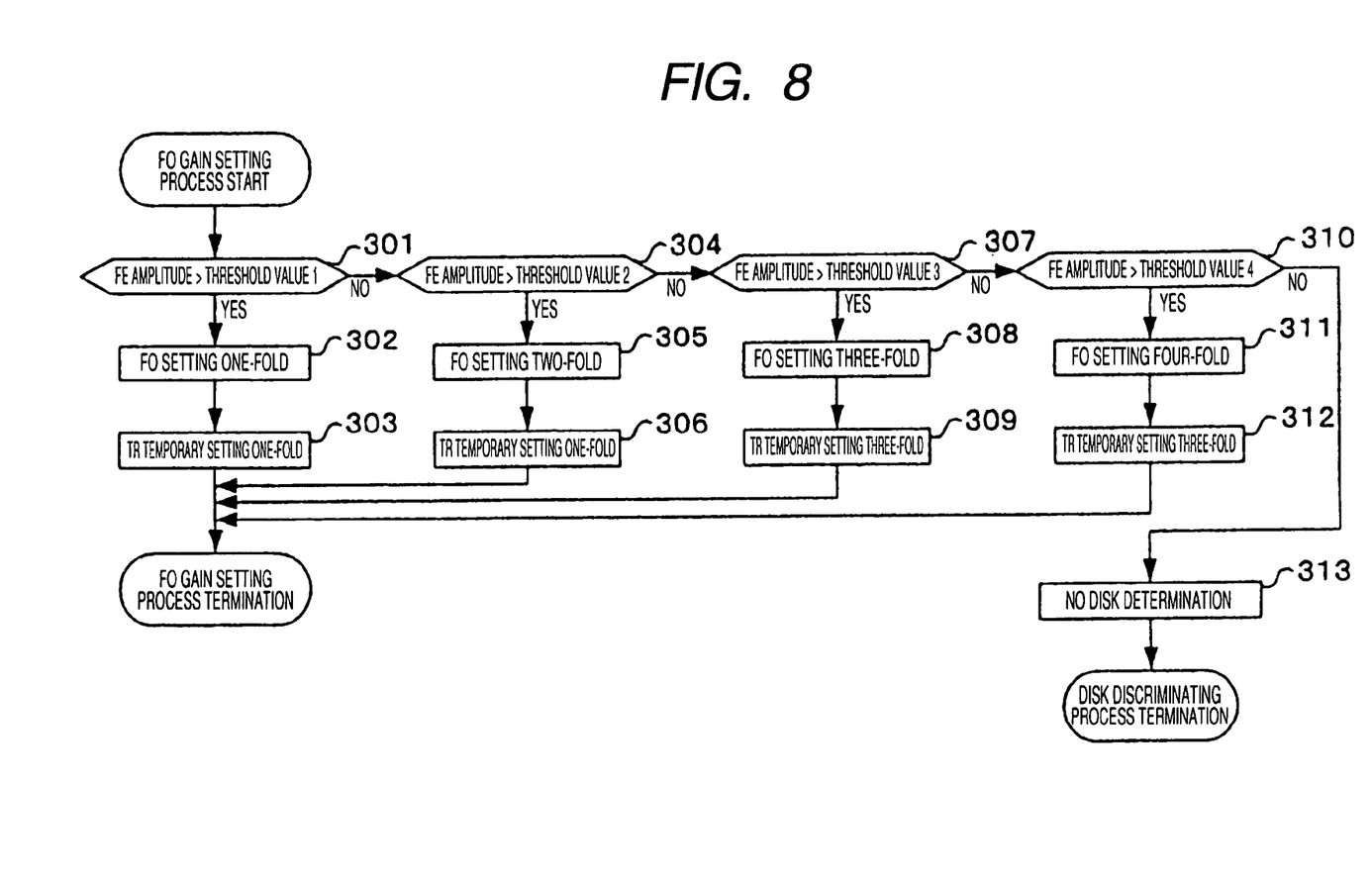
FIG. 8 is a flow chart illustrating processes other than the process of Step 15 in FIG. 3.

In the optical disk reproducing apparatuses of the first and second embodiments, in the process of temporarily setting the tracking gain in Step 106 and Step 112 as shown in FIG. 4, the tracking gains are temporarily set to two-fold and four-fold, respectively. Alternatively, as shown in FIG. 8, it may be configured that Step 306 corresponding to Step 106 takes the same value as Step 303, and Step 312 corresponding to Step 112 takes the same value as Step 309. The reason for such a process is that the tracking gain is temporarily set after the focus gain setting process is terminated, the spindle drive signal is output by the spindle servo circuit 18, therefore, precision of the track gain is unquestioned. By integrating temporary set values into two kinds, a memory area can be saved.

In addition, in the optical disk reproducing apparatuses in the first and second embodiments, an average of a plurality of focus error amplitudes, which is calculated by the calculating part 16, is taken as a new focus error amplitude, an average of a plurality of tracking error amplitudes, which is calculated by the calculating part 16, is taken as a new tracking error amplitude, and a focus gain is set and a tracking gain is temporarily set based on the new focus and tracking error amplitudes. Alternatively, the maximum value of a plurality of focus error amplitudes, which is calculated by the calculating part 16, may be taken as a new focus error amplitude and the maximum value of a plurality of tracking error amplitudes, which is calculated by the calculating part 16, may be taken as a new tracking error amplitude. By doing so, since a focus gain is set and a tracking gain is temporarily set based on the new focus and tracking error amplitudes, it is possible to improve precision of discrimination of the optical disks 30 such as CD-DA with low reflectivity and high gain in a portion thereof due to a contaminant, such as a fingerprint, or a damage.

Alternatively, it may be configured that a plurality of focus error amplitudes and a plurality of tracking error amplitudes are compared with respective threshold values, and, according to a result of the comparison, an amplification gain indicated by a larger one of the threshold values is selected, and an amplification gain of an error signal is changed to the selected amplification gain. By doing so, it is possible to improve precision of discrimination of the optical disks 30 with differences in reflectivity on the same disk, which may occur when there are variations in laser power in writing data into the optical disks 30, such as CD-R or CD-RW, by means of a writing drive or when data are written into the same disk by a plurality of drives with different laser power.

The conventional disk discriminating technique repeats a series of processes where an amplitude of a focus error signal is measured one time and is compared with a threshold value, an amplitude of a tracking error signal is measured one time and is compared with a threshold value, and the kind of an optical disk is discriminated. However, according to a technical configuration of the present invention, an amplitude of one of the focus error signal and the tracking error signal is measured several times, and, according to a result of comparison between the measured amplitude and a threshold value, the kind of the optical disk can be discriminated based on a plurality of amplitudes, without repeating a series of conventional processes. Accordingly, the present invention provides an effect of discriminating the kind of a disk in a short time, as compared to the conventional technique, and is useful for a disk discriminating method and a disk discrimination apparatus for discriminating the kind of an optical disk.

What is claimed is:

1. A disk discriminating method of discriminating the kind of an optical disk, comprising the steps of:
   measuring an amplitude of one of a focus error signal and a tracking error signal several times, wherein the focus error signal is generated based on a focus drive signal giving disturbance to a pickup in a focus direction and the tracking error signal is generated based on a tracking drive signal giving disturbance to the pickup in a radial direction of the optical disk;
   comparing the measured amplitude of one of the focus error signal and the tracking error signal with a threshold value, after the several times of measuring; and
   discriminating the kind of the optical disk according to the result of the comparison,
   wherein the discriminating step comprises determining whether to change an amplification gain of one of the focus error signal and the tracking error signal based on the result of the comparison, and changing the amplification gain of one of focus error signal and the tracking error signal based on the threshold value used for the comparison if it is determined to change the amplification gain, and discriminating the kind of the optical disk based on the changed amplification gain.

2. A disk discriminating method of discriminating the kind of an optical disk, comprising the steps of:
   measuring an amplitude of one of a focus error signal and a tracking error signal several times, wherein the focus error signal is generated based on a focus drive signal giving disturbance to a pickup in a focus direction and the tracking error signal is generated based on a tracking drive signal giving disturbance to the pickup in a radial direction of the optical disk;
   comparing the measured amplitude of one of the focus error signal and the tracking error signal with a threshold value, after the several times of measuring; and
   discriminating the kind of the optical disk according to the result of the comparison,
   wherein the measuring step comprises measuring the amplitude at the measuring after first measuring using position information of points at which the maximum value and the minimum value of the amplitude of one of the focus error signal and the tracking error signal are measured at the first measuring.

3. The disk discriminating method according to claim 1, wherein the measuring step comprises measuring the focus error signal several times,
   the comparing step comprises comparing the focus error signal measured several times with a plurality of threshold values, respectively, and
   the discriminating step comprises changing an amplification gain of the focus error signal to a threshold value used for the comparison according to the result of the comparison whenever the comparison is performed in the comparing step and temporarily setting an amplification gain of the tracking error signal.

4. The disk discriminating method according to claim 3, further comprising the step of accelerating the rotation of the optical disk,
   wherein, for the accelerated optical disk, an amplitude of the tracking error signal is measured, the measured amplitude of the tracking error signal is compared with the threshold value, and it is determined whether to change the amplification gain of the tracking error signal according to the result of the comparison.

5. A disk discriminating method of discriminating the kind of an optical disk, comprising the steps of:
   measuring an amplitude of one of a focus error signal and a tracking error signal several times, wherein the focus error signal is generated based on a focus drive signal giving disturbance to a pickup in a focus direction and the tracking error signal is generated based on a tracking drive signal giving disturbance to the pickup in a radial direction of the optical disk;
   comparing the measured amplitude of one of the focus error signal and the tracking error signal with a threshold value, after the several times of measuring; and
   discriminating the kind of the optical disk according to the result of the comparison
   wherein the comparing step comprises comparing one of amplitudes of one of the focus error signal and the tracking error signal with the threshold value, the amplitudes being measured several times, and selecting the most frequent result of the comparison of all results of the comparison.

6. A disk discriminating method comprising the steps of:
measuring an amplitude of a tracking error signal several times and storing the results of the measurement in respective storing locations in a measurement order;
reading a current counter value from the stored results of the measurement, comparing the counter value with a threshold value, and determining whether to change an amplification gain of the tracking error signal;
changing the amplification gain of the tracking error signal, if it is determined to change the amplification gain of the tracking error signal, in the determining step; and
discriminating the kind of a disk that performs a tracking servo-on step if it is determined that tracking gain-up is not required, and a count routine if it is determined that the tracking gain-up is required,
if an initial value of the counter is zero and the method proceeds from the discriminating step, 1 is added to the value of the counter, the method proceeds to the determining step after the results of measurement are compared with the threshold value if the result of the addition is less than a prescribed value, and the method proceeds to the tracking servo-on step if the result of the addition is more than the prescribed value.

7. A disk discriminating method comprising the steps of:
measuring an amplitude of a focus error signal several times and storing results of the measurement in respective storing locations in a measurement order;
reading a current counter value from the stored results of the measurement, comparing the counter value with a threshold value, and determining whether to change an amplification gain of the focus error signal;
changing the amplification gain of the focus error signal, if it is determined to change the amplification gain of the focus error signal, in the determining step; and
discriminating the kind of a disk that performs a focus servo-on step if it is determined that focus gain-up is not required, and a count routine if it is determined that the focus gain-up is required,
if an initial value of the counter is zero and the method proceeds from the discriminating step, 1 is added to the value of the counter, the method proceeds to the determining step after the results of measurement are compared with the threshold value if a result of the addition is less than a prescribed value, and the method proceeds to the focus servo-on step if the result of the addition is more than the prescribed value.

8. A disk discriminating apparatus for discriminating the kind of an optical disk, comprising:
measuring means for measuring an amplitude of one of a focus error signal and a tracking error signal several times, the focus error signal being generated based on a focus drive signal giving disturbance to a pickup in a focus direction and the tracking error signal being generated based on a tracking drive signal giving disturbance to the pickup in a radial direction of the optical disk;
comparing means for comparing the measured amplitude of one of the focus error signal and the tracking error signal with a threshold value; and
discriminating means for discriminating the kind of the optical disk according to the result of the comparison,
wherein the discriminating means determines whether to change an amplification gain of one of the focus error signal and the tracking error signal based on the result of the comparison, changes the amplification gain of one of focus error signal and the tracking error signal based on the threshold value used for the comparison if it is determined to change the amplification gain, and discriminates the kind of the optical disk based on the changed amplification gain.

9. A disk discriminating apparatus for discriminating the kind of an optical disk, comprising:
measuring means for measuring an amplitude of one of a focus error signal and a tracking error signal several times, the focus error signal being generated based on a focus drive signal giving disturbance to a pickup in a focus direction and the tracking error signal being generated based on a tracking drive signal giving disturbance to the pickup in a radial direction of the optical disk;
comparing means for comparing the measured amplitude of one of the focus error signal and the tracking error signal with a threshold value; and
discriminating means for discriminating the kind of the optical disk according to the result of the comparison,
wherein the measuring means measures the amplitude at the measuring after first measuring using position information of points at which the maximum value and the minimum value of the amplitude of one of the focus error signal and the tracking error signal are measured for at the first measuring.

10. The disk discriminating apparatus according to claim 8, wherein the measuring means measures the focus error signal several times,
the comparing means compares the focus error signal measured several times with a plurality of threshold values, respectively, and
the discriminating means changes an amplification gain of the focus error signal to a threshold value used for the comparison according to the result of the comparison whenever the comparison is performed in the comparing means, and temporarily sets an amplification gain of the tracking error signal.

11. The disk discriminating apparatus according to claim 10, further comprising rotation accelerating means for accelerating the rotation of the optical disk,
wherein, for the accelerated optical disk, the measuring means measures an amplitude of the tracking error signal, the comparing means compares the measured amplitude of the tracking error signal with the threshold value, and the discriminating means determines whether to change the amplification gain of the tracking error signal according to a result of the comparison.

12. A disk discriminating apparatus for discriminating the kind of an optical disk, comprising:
measuring means for measuring an amplitude of one of a focus error signal and a tracking error signal several times, the focus error signal being generated based on a focus drive signal giving disturbance to a pickup in a focus direction and the tracking error signal being generated based on a tracking drive signal giving disturbance to the pickup in a radial direction of the optical disk;
comparing means for comparing the measured amplitude of one of the focus error signal and the tracking error signal with a threshold value; and
discriminating means for discriminating the kind of the optical disk according to the result of the comparison,
wherein the comparing means compares one of amplitudes of one of the focus error signal and the tracking error signal with the threshold value, the amplitudes being measured several times, and selects the most frequent result of the comparison of all results of the comparison.

* * * * *

UNITED STATES PATENT AND TRADEMARK OFFICE
CERTIFICATE OF CORRECTION

PATENT NO. : 7,646,689 B2  
APPLICATION NO. : 11/337094  
DATED : January 12, 2010  
INVENTOR(S) : Hatanaka et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

Twenty-eighth Day of December, 2010

David J. Kappos  
*Director of the United States Patent and Trademark Office*